United States Patent [19]

Uzawa et al.

[11] Patent Number: 5,172,610
[45] Date of Patent: Dec. 22, 1992

[54] STEPLESS-SPEED-CHANGER ENGINE BRAKE CONTROLLER

[75] Inventors: Hiroshi Uzawa, Kameoka; Motosada Kiri, Nishikyo, both of Japan

[73] Assignee: Shimadzu Corporation, Kyoto, Japan

[21] Appl. No.: 605,306

[22] Filed: Oct. 30, 1990

[30] Foreign Application Priority Data

Oct. 31, 1989 [JP] Japan .................... 1-284074
Oct. 31, 1989 [JP] Japan .................... 1-284075

[51] Int. Cl.$^5$ ............................................ B60K 41/16
[52] U.S. Cl. ........................................ 74/866; 74/858; 74/877
[58] Field of Search ...................... 74/866, 877, 858

[56] References Cited

U.S. PATENT DOCUMENTS

| | | | |
|---|---|---|---|
| 4,445,329 | 5/1984 | Drisko | 74/861 X |
| 4,663,714 | 5/1987 | Cornell et al. | 192/76 |
| 4,771,656 | 9/1988 | Itoh et al. | 74/866 |
| 4,793,217 | 12/1988 | Morisawa et al. | 74/866 |
| 4,796,489 | 1/1989 | Nagamatsu et al. | 74/868 |
| 4,819,514 | 4/1989 | Yamamuro et al. | 74/868 |
| 4,976,169 | 12/1990 | Sasajima | 74/866 |

Primary Examiner—Leslie A. Braun
Assistant Examiner—Benjamin Levi
Attorney, Agent, or Firm—Nikaido, Marmelstein, Murray & Oram

[57] ABSTRACT

A stepless-speed-changer engine brake controller for a vehicle having detection means for detecting as an offset an angle displacement from the maximum opening to an actual opening in an accelerator opening variation region where the throttle opening in made zero, detection means for detecting a vehicle speed, and control means for inputting the offset and the vehicle speed from the respective detection means and for controlling the speed ratio of said stepless-speed-changer in such a manner that an engine brake torque varies according to an increase or a decrease of the offset and the vehicle speed.

2 Claims, 10 Drawing Sheets

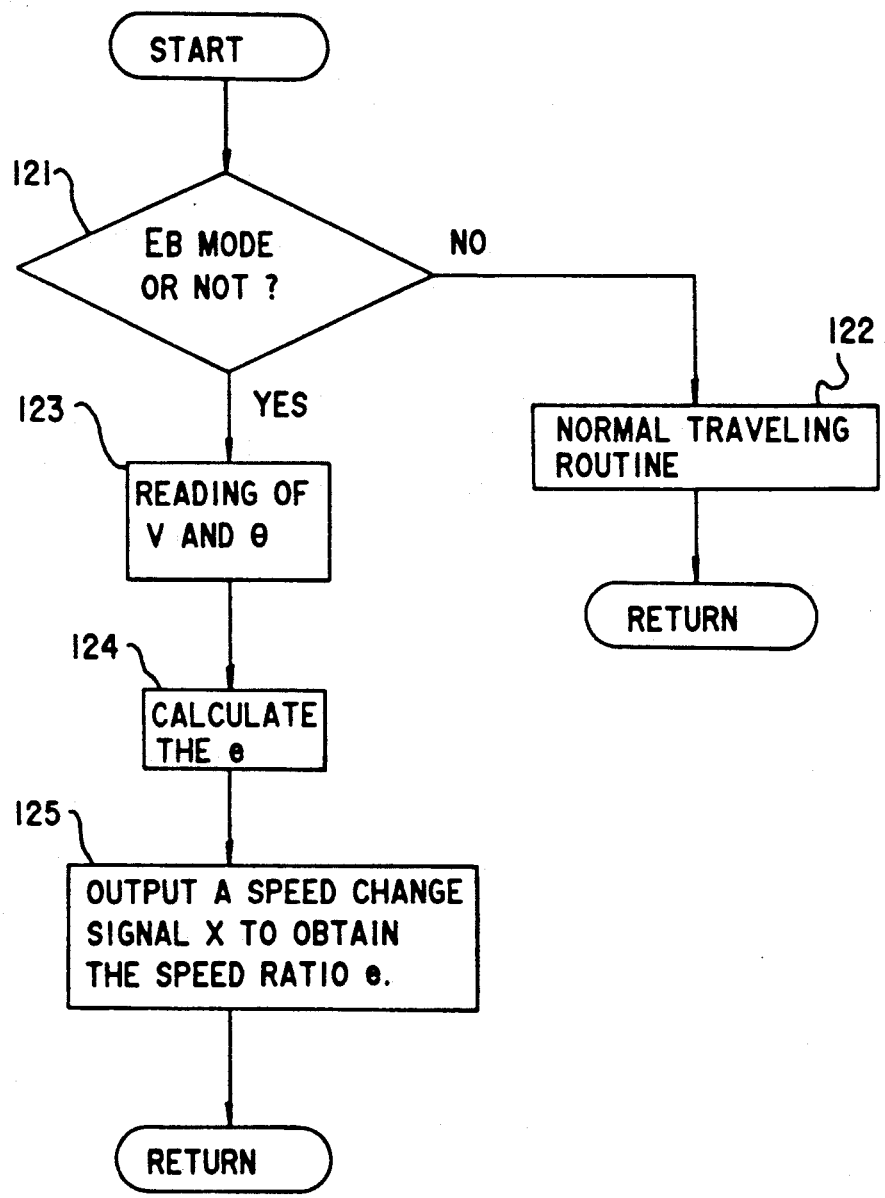

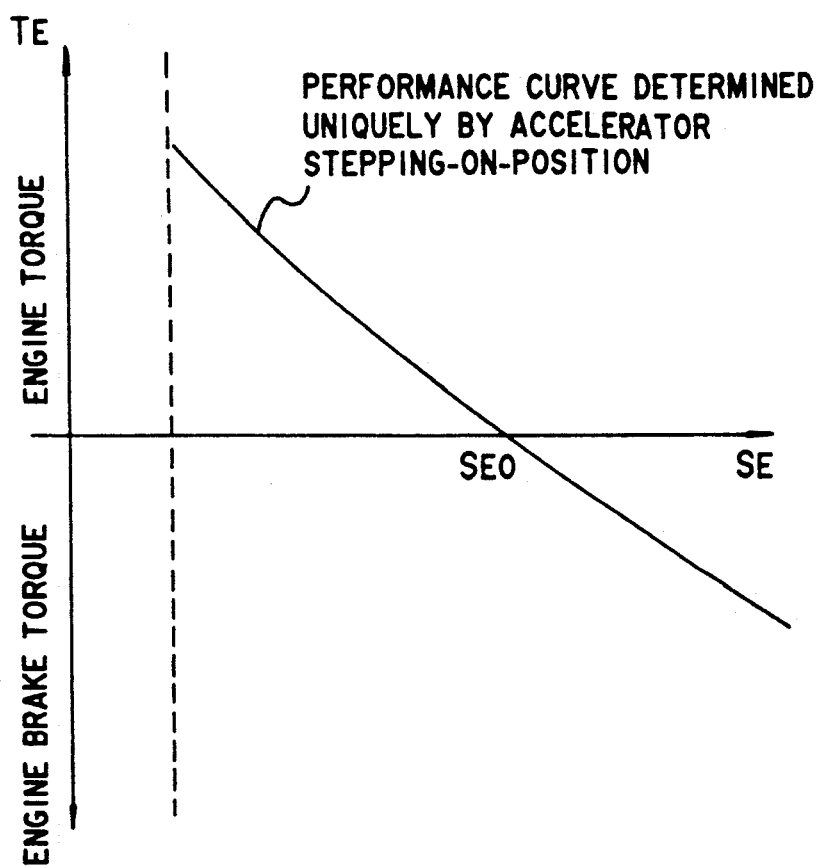

STEPLESS-SPEED-CHANGER ENGINE BRAKE CONTROLLER

BRIEF SUMMARY OF THE INVENTION

The present invention relates to a stepless-speed-changer engine brake controller preferably applicable to where the stepless-speed-changer is utilized as a vehicle transmission.

When an automobile is drived, it is essential with respect to traveling stability to exert an engine brake at a curve or a descent so as to apply a brake. In order to exert an engine brake torque, for a manual automobile, a change lever is shifted into a low speed position during a clutch is opened, and for an automatic automobile, the selector lever is shifted into a low speed position.

However, the engine brake torque thus obtained has an unique value determined by an intrinsic gear ratio at the new position and a vehicle speed at that time, and cannot be freely adjusted by a driver. That is, the gear ratio is set stepwise for each position and a large difference between engine brake torques occurs according to a position selected, so that the driver must try to select a suitable position if possible. However, at a position once selected, an uniform engine brake torque occurs according to a vehicle speed when a non-accelerated condition is made, so that the driver must rely on only a brake pedal when a further braking is required. Accordingly, there is a problem that it is difficult to sufficiently secure the traveling stability at a curve or a descent. In addition to such problem, there is also a problem that such vehicles are liable to become a dangerous condition due to an operation delay of the shift lever or the brake pedal.

On the other hand, vehicles equipped with a stepless-speed-changer whose speed change control has been programmed in relation to the vehicle speed and the like are available, and also not different from the above-described vehicles in that even when the accelerator is opened, an engine brake torque little occurs and even if the torque occurs, the vehicle speed cannot be freely adjusted by the driver.

The present invention has been made to solve such problems, and on condition that a stepless-speed-changer whose speed ratio can be steplessly changed is utilized, is designed to provide an engine brake controller which can change positively an engine brake torque with a simple operation even in a non-accelerated condition to the stepless-speed-changer.

The present invention employs the following arrangement to achieve such purpose.

That is, a stepless-speed-changer engine brake controller according to a first invention as shown in FIG. 1 comprises detection means for detecting as an offset an angle displacement from the maximum opening to an actual opening in an accelerator opening variation region (a non-accelerated region colloquially called play) where the throttle opening is made zero, and control means for inputting the offset from the detection means and for controlling a speed ratio of said stepless-speed-changer in such a manner that an engine brake torque varies according to an increase or a decrease of the offset.

With such arrangement, when the offset of the accelerator changes, a new offset is detected by the detection means, which control the speed ratio of the stepless-speed-changer so as to change the engine brake torque according to an increase of a decrease of the offset.

Accordingly, a driver can adjust positively the engine brake torque only by stepping on the accelerator even in a non-accelerated condition, whereby an introduction to such a decelerated condition can be simply performed even from an accelerated region.

With an engine brake controller of the present invention applied to a vehicle equipped with a stepless-speed-changer, an engine brake torque can be freely changed according to self-determination of a driver to apply a brake only by the offset operation of an accelerator without frequently operating a brake pedal in a non-accelerated condition, and thus such function allows the traveling stability at a curve or a descent to be improved and a dangerousness due to operation delay and the like to be surely reduced.

A stepless-speed-changer engine brake controller according to a second invention as shown in FIG. 7 comprises detection means for detecting an actual accelerator stepping-on position, detection means for detecting a vehicle speed, and control means for inputting the actual accelerator stepping-on position and the vehicle speed from the respective detection means, for providing a stepping-on reference point in such a manner that the position is moreover shifted to the stepping-on side as the vehicle speed increases, and for controlling a speed ratio of the stepless-speed-changer in such a manner that an engine brake torque varies according to the magnitude of a displacement between the actual accelerator stepping-on position and the stepping-on reference point when the actual accelerator stepping-on position is shallower than the stepping-on reference point.

With such arrangement, when a driver steps on deeply the accelerator exceeding the stepping-on reference point, a normal acceleration operation is performed, while when the stepping-on of the accelerator is made shallower than the stepping-on reference point, an engine brake according to the displacement from the stepping-on reference point to the actual stepping-on position is applied through the control means.

At this time, the stepping-on reference point is moreover shifted and set to the stepping-on side as the traveling speed increases, and accordingly an accelerator stepping-on region capable of developing an engine brake is widened, so that the driver can freely use the engine brake in various ways by utilizing the widened operation region. On the contrary, the stepping-on reference point is moreover shifted and set to the accelerator open side as the traveling speed decreases, and accordingly the accelerator stepping-on region capable of developing an engine brake is narrowed, so that the driver can perform stop operation and the like without being accompanied by an unsuitable engine brake.

With an engine brake controller of the second invention applied to a vehicle equipped with a stepless-speed-changer, a proper engine brake can be generated according to self-determination of a driver to apply a brake only by a simple accelerator operation without performing shift operation or brake operation and the width of the adjustment can be made wider as the speed increase, thereby allowing the traveling stability at a curve or a descent to be improved and a dangerousness due to operation delay and the like to be surely reduced. At the same time, a smooth operation for stoppage can be also secured.

BRIEF DESCRIPTION OF THE DRAWINGS

FIG. 11 is a flowchart,
and
FIG. 12 is a graph showing the characteristic curve of an engine.

DETAILED DESCRIPTION OF THE PREFERRED EMBODIMENT

With reference to the drawings, the embodiments of these inventions will be explained hereinafter.

Figure 1:
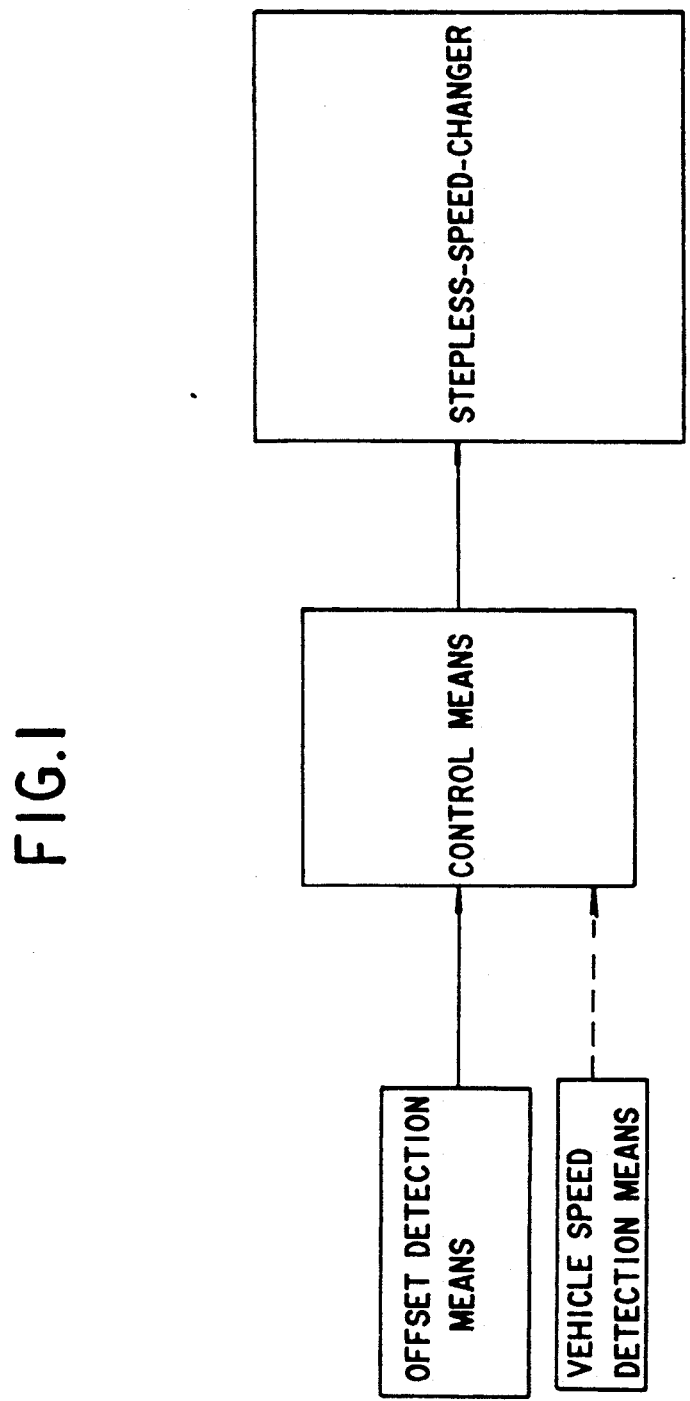
FIG. 1 is a diagram illustrating the arrangement of the first invention.
Figure 2:
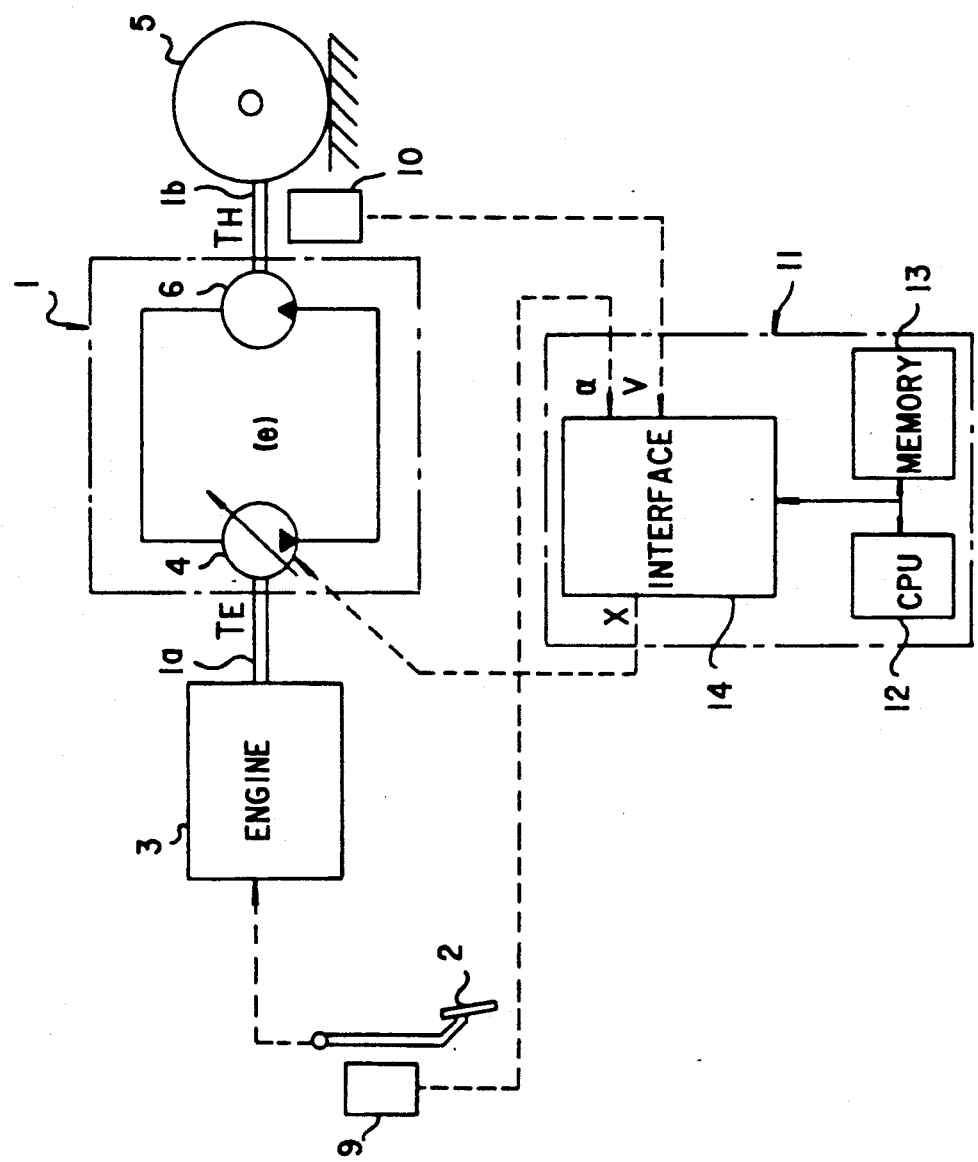
FIG. 2 is a schematic circuit diagram.
Figure 3:
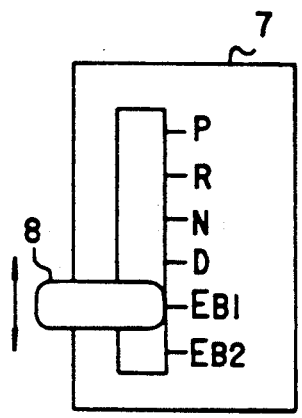
FIG. 3 is a plan view of a position selector.

A stepless-speed-changer 1 for a vehicle to which an embodiment of the first invention is applied, as shown in FIG. 2, is equipped with a variable-displacement type hydraulic pump 4 driven by an engine 3 whose output changes according to the stepping-on depth of an accelerator pedal 2, and a hydraulic motor 6 driving a wheel 5 by a pressurized liquid discharged from the hydraulic pump 4. By changing the volume of the hydraulic pump 4, a speed ratio can be steplessly adjusted. Also, the vehicle is provided with a mode selector 7 as shown in FIG. 3. On the mode selector 7, a parking mode P, a reverse mode R, a neutral mode N and a drive mode D, as well as two engine brake control modes $E_{B1}$ and $E_{B2}$ are set. When a shift lever 8 is set to either of the two engine brake control modes $E_{B1}$ and $E_{B2}$, an engine brake controller according to the present embodiment is operated.

Figure 4:
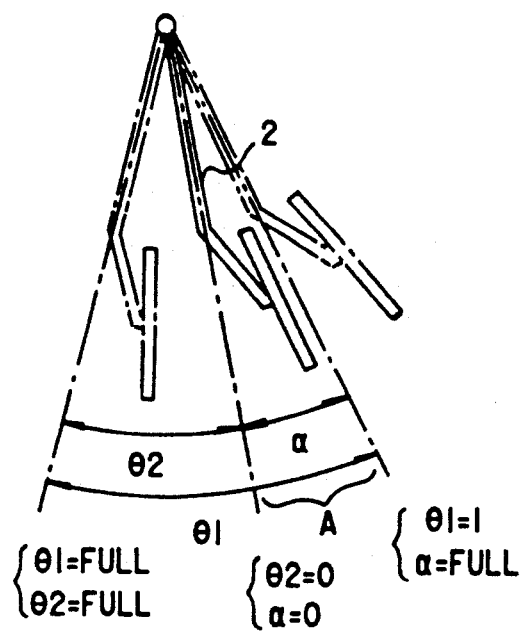
FIG. 4 is an illustrative diagram of an offset.

In arranging the engine brake controller, on the accelerator pedal 2 as shown in FIG. 4, an accelerator opening variation region A where a throttle opening $\theta_2$ is zero, is significantly large. The accelerator opening variation region A is a part remaining by subtracting the throttle opening variation region $\theta_2$ from a full accelerator opening variation region $\theta_1$, and an angle displacement from an opening at which the $\theta_1$ becomes maximum in the region A, to an actual accelerator opening set as a offset $\alpha$. On the periphery of such accelerator pedal 2, detection means 9 for detecting the offset $\alpha$ is located as shown in FIG. 2, and on the periphery of the traveling wheel 5, detection means 10 for detecting a vehicle speed V is located. The detection means 9 and 10 employ a proper sensor, for example, a potentiometer, a rotary encoder or a tachogenerator. Also provided is a microcomputer 11 being control means for inputting the detected values $\alpha$ and V taken out from the both detection means 9 and 10 and for outputting a proper speed change control signal x to the stepless-speed-changer 1.

The microcomputer 11 is known control means having a CPU 12, a memory 13 and an interface 14, and a program to control the CPU 12 is stored in the memory 13. According to the program, the CPU 12 performs a specified operation to determine the speed ratio e based on the detected values $\alpha$ and V sequentially inputted and the data previously stored in the memory 13, and outputs the control signal x to allow the speed ratio e to the hydraulic pump 4 of the stepless-speed-changer 1 so that the volume can be properly changed.

Figure 5:
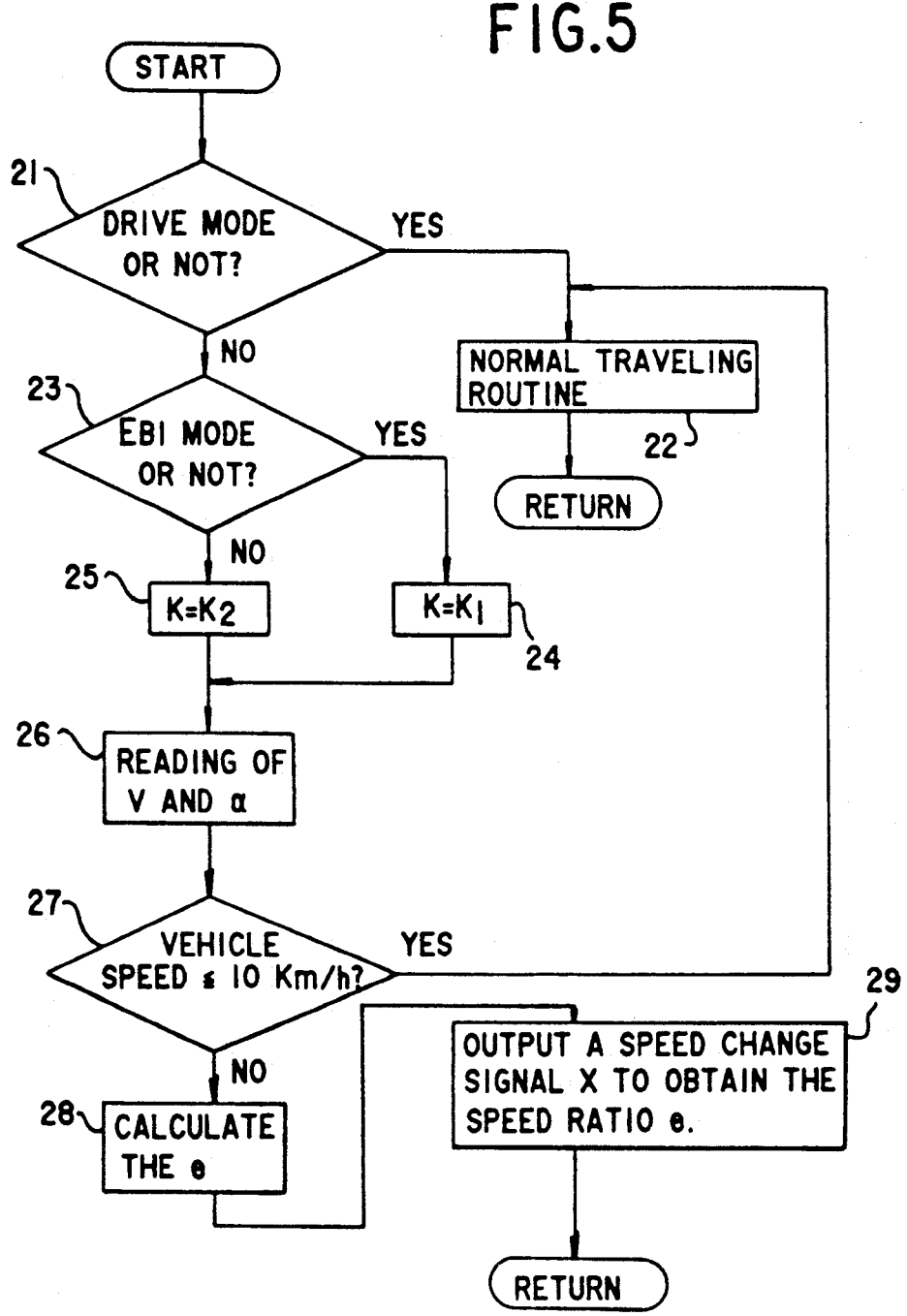
FIG. 5 is a flowchart.

FIG. 5 is a flowchart showing the outline of the program. Along the flowchart, the operation of the present embodiment will be explained hereinafter. When the program is started, at a step 21, first the selector 7 determines whether the mode is the drive mode D or not. If YES, the step is shifted to a normal traveling routine 22. The routine 22 consists of a program to control the speed ratio e in the drive mode D, and in the routine an operation by a general technique is performed. Then, after the speed control is performed, the step is returned. If NO at the step 21, the mode selector 7 at a step 23 determines whether the mode is the $E_{B1}$ or not. If YES, $k=k_1$ (k is described later) is set at a step 24, and if NO, $k=k_2$ is set at a step 25, and then the both steps are shifted to a step 26 where the vehicle speed V and the offset $\alpha$ are read into the CPU 12. After step 26, the program determines whether $\alpha$ is less than zero. If YES, then the operation is shifted to the normal traveling routine for controlling the speed ratio of the stepless speed changer to the normal traveling state. Thus, in any one of modes $E_b$, $E_{b1}$, and $E_{b2}$, this check is performed. If $\alpha$ exceeds zero, then step 27 is performed. Then, at a step 27, first whether the vehicle speed V is 10 km/h or less or not is determined. If YES, even if the speed ratio e is properly controlled, an effective engine brake is difficult to generate and rather an inconvenience such as a blowing up of the engine 3 develops as a large factor, so that the engine brake control according to the present invention is not performed, and the step is shifted to the normal traveling routine of the step 22. If NO, the operation of the speed ratio e is performed at a step 28.

Figure 6:
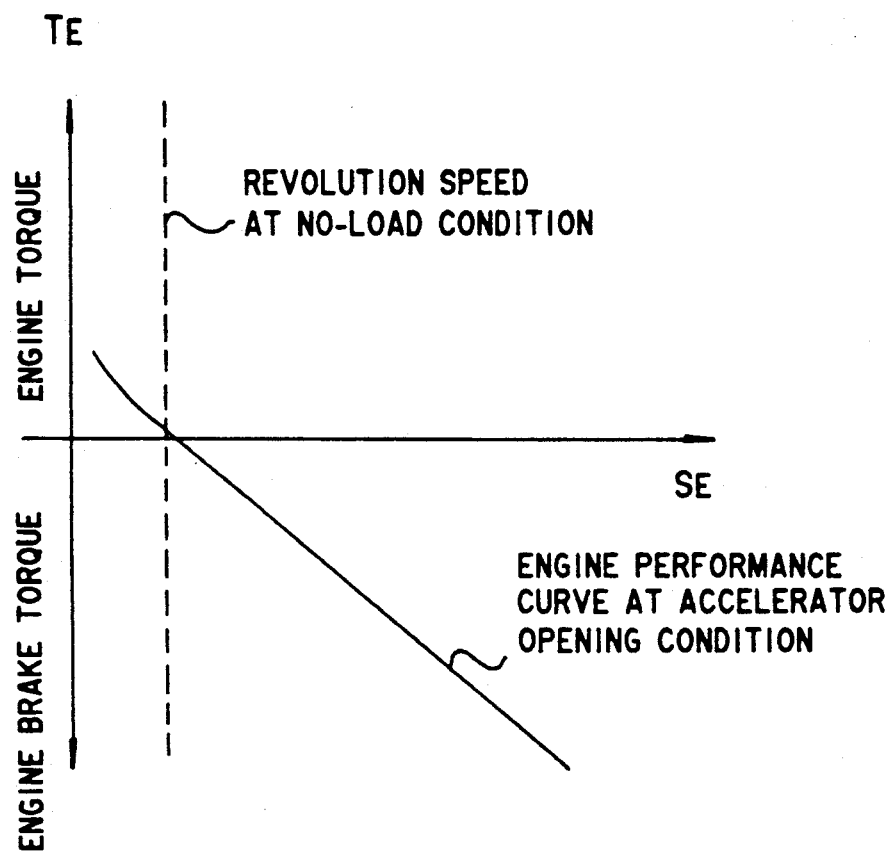
FIG. 6 is a graph showing the characteristic curve of an engine.
Figure 7:
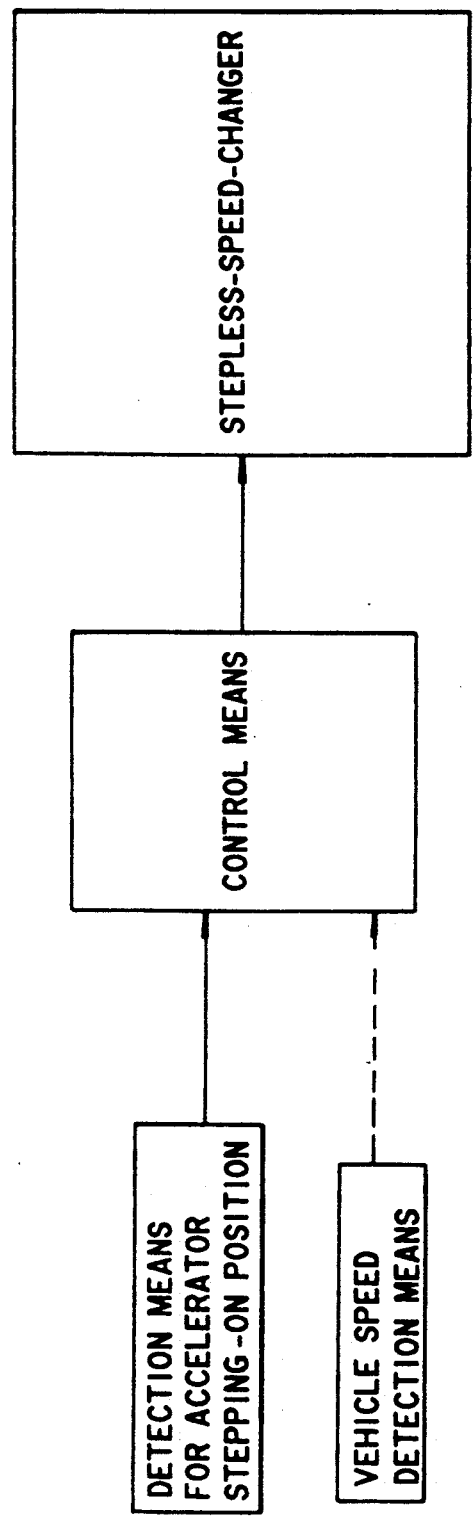
FIG. 7 is a diagram illustrating the arrangement of the second invention.

An operational equation used at that time has been set as follows: As shown in FIG. 2, if a torque occuring on an input shaft 1a of the stepless-speed-changer 1 represents an engine brake torque $T_E$, and a torque occuring on an output shaft 1b of thereof represents a wheel torque $T_H$, from an engine performance curve (see FIG. 6) during accelerator open, the following straight-line approximative equation can be established:

$$T_E = C_1 \times S_E \quad (1)$$

where $C_1$ is a coefficient and $S_E$ is an engine revolution speed. With $C_2$ expressing a coefficient, the following two equations are also true for the stepless-speed-changer 1:

$$T_H = T_E/e \quad (2)$$

$$V = C_2 \times e \times S_E \quad (3)$$

Then, in order to correspond the engine brake torque $T_E$ to the offset $\alpha$ of the accelerator pedal 2, the following equation is defined:

$$T_H = k \times \alpha \quad (4)$$

where k is determined by the $E_{B1}$ mode or the $E_{B2}$ mode previously selected through the selector lever 8 by a driver, represents a value of $k_1$ or $k_2$ ($k_1 < k_2$), and governs the condition of brake exerting. Thus, from the equations (1) through (4), the following equation is obtained:

$$e = \{V/(k \times C_2 \times \alpha)\}^{\frac{1}{2}} \quad (5)$$

The CPU operates the e according to the equation (5).

Then, at a step 29, the control signal x to allow the speed ratio e is outputted to the hydraulic pump 4, and thereafter the step is returned.

With such arrangement, as defined with the equation (4), an brake effect occurs corresponding to the offset $\alpha$ of the accelerator pedal 2 occurs even in a condition of non-acceleration, thereby allowing the driver to positively change through the offset operation thereof the engine brake. Accordingly, he can freely apply an engine brake matched with his driving sense to improve a traveling stability. Also, such control is performed through the accelerator operation, so that the shift to such deceleration condition can be simply made even from the acceleration region to provide an excellent operability.

Figure 8:
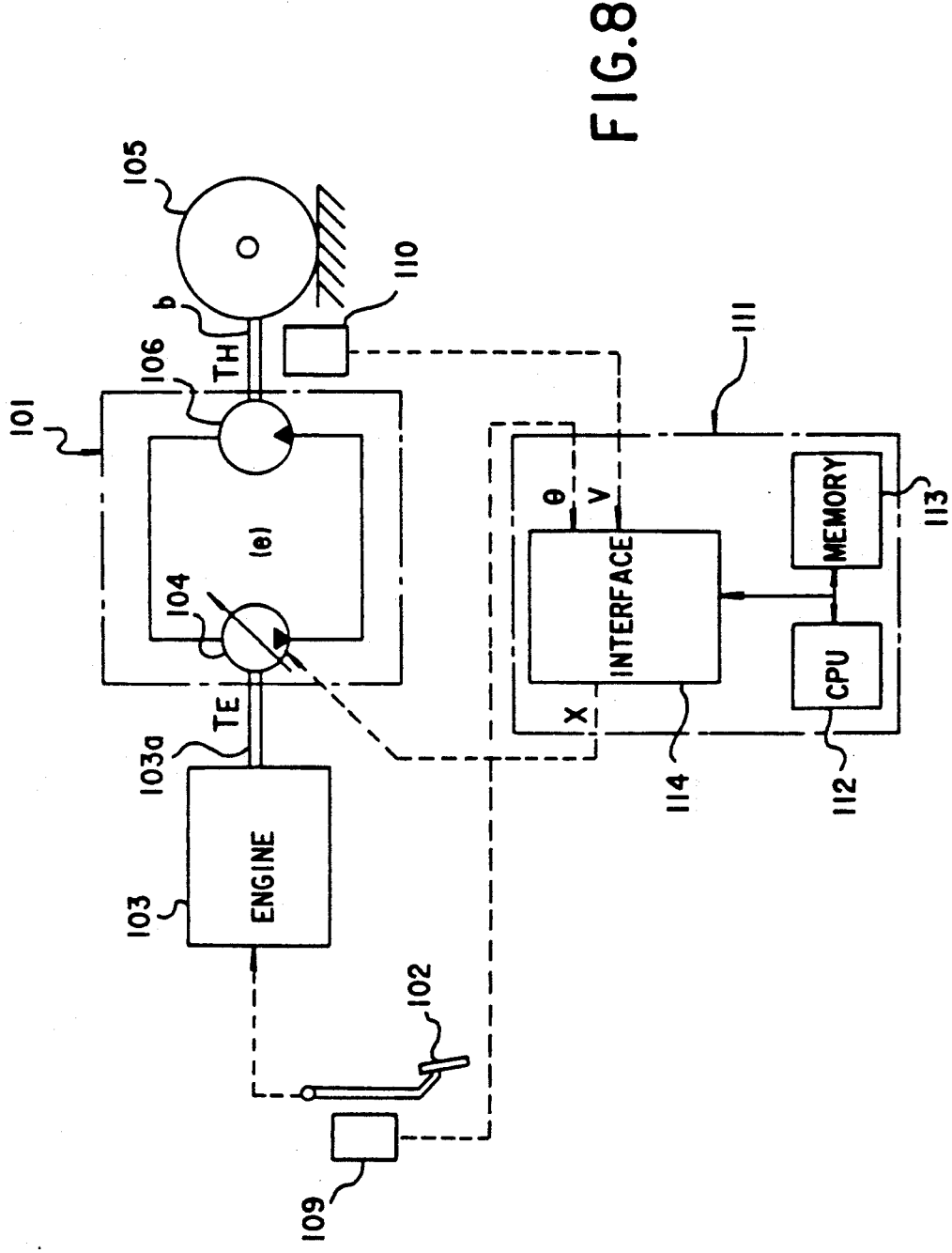
FIG. 8 is a schematic circuit diagram.
Figure 9:
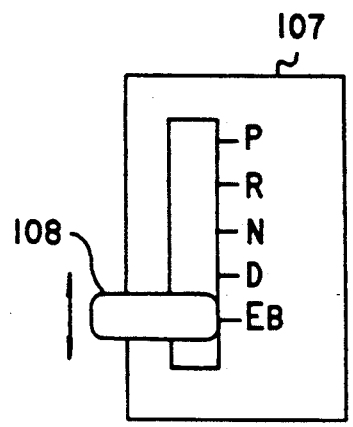
FIG. 9 is a plan view of a position selector.

FIGS. 7 through 12 show an embodiment of the second invention. A stepless-speed-changer 101 for a vehicle to which the embodiment is applied, as shown in FIG. 8, is equipped with a variable-displacement type hydraulic pump 104 driven by an engine 103 whose output changes according to the stepping-on depth of an accelerator pedal 102, and a hydraulic motor 106 driving the wheel 5 by a pressurized liquid discharged from the hydraulic pump 104. By changing the volume of the hydraulic pump 104, the speed ratio e can be steplessly adjusted. Also, the vehicle is provided with a mode selector 107 as shown in FIG. 9. On the mode selector 107, the parking mode P, the reverse mode R, the neutral mode N and the drive mode D, as well an engine brake control mode $E_B$ are set. When a shift lever 108 is set to the engine brake control mode $E_B$, an engine brake controller according to the present embodiment is operated.

Figure 10:
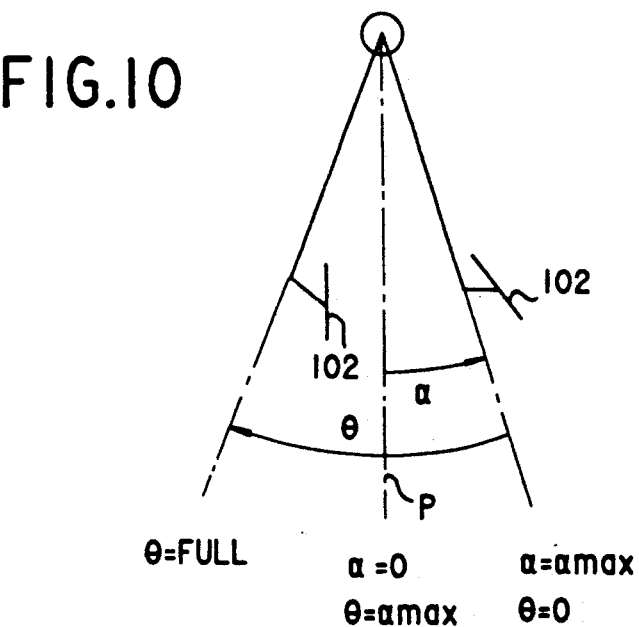
FIG. 10 is a typical diagram of an accelerator pedal.

As shown in FIGS. 8 and 10, the engine brake controller includes detection means 109 located for detecting a stepping-on position $\theta$ ($0 \leq \theta \leq$ full) of the accelerator pedal 102, and detection means 110 located for detecting a vehicle speed. The detection means 109 and 110 employ a proper sensor, for example, a potentiometer, a rotary encoder or a tachogenerator.

Also the controller includes a microcomputer 111 being control means for inputting the detected values $\theta$ and V taken out from the both detection means 109 and 110 and for outputting a proper speed change control signal x to the stepless-speed-changer 1.

The microcomputer 111 is known control means having a CPU 112, a memory 113 and an interface 114, and a program to control the CPU 112 is stored in the memory 113. According to the program, the CPU 112 performs a specified operation to determine the speed ratio e based on the detected values $\theta$ and V sequentially inputted and the data previously stored in the memory 113, and outputs the control signal x to allow the speed ratio e to the hydraulic pump 104 of the stepless-speed-changer 101 so that the volume can be properly changed.

FIG. 11 is a flowchart showing the outline of the program. Along the flowchart, the operation of the present embodiment will be explained hereinafter. When the program is started, at a step 121, first the selector 107 determines whether the mode is the engine brake control mode $E_B$ or not. If NO, the step is shifted to a normal traveling routine 122. In the routine 122, a program to control the speed ration e in the drive mode D is incorporated, and an operation by a general technique is performed. Then, after the speed control is performed, the set p is returned. If YES at the step 121, then the vehicle speed V and the accelerator stepping-on position $\theta$ are read into the CPU 112 at a step 123. The program then checks to see if $\theta$ exceeds $\alpha_{max}$. If YES, operation is shifted to the normal traveling routine for controlling the speed ratio of the stepless speed changer to the normal traveling state. If NO, then the program moves to step 124. Therefore, this check is performed for any one of modes $E_b$, $E_{b1}$, and $E_{b2}$. Control during the state of $\alpha_{max}$ is $< \theta <$ full is known in the prior art. Then, the operation of the target speed ratio e is performed at a step 124.

An operational equation used at that time has been set as follows: If an engine torque (when a minus value, an engine brake torque) occuring on a shaft 103a of the engine 103 represents $T_E$, the $T_E$ becomes a function of the accelerator stepping-on position (accelerator opening) $\theta$ and the engine revolution speed $S_E$, and is expressed in the following equation:

$$T_E(\theta, S_E) = f(S_E - S_{E0}(\theta)) \tag{101}$$

where $S_{E0}(\theta)$ is an engine revolution speed of the engine exhibiting no-load condition at the $\theta$ (see FIG. 12). Also, the $S_E$, with $C_1$ expressing a coefficient, has a relationship with the vehicle speed V and the speed ratio e expressed in the following equation:

$$S_E = V/(C_1 \times e) \tag{102}$$

Thus, from the equations (101) and (102), the following equation is obtained:

$$T_E(\theta, S_E) = f(V/(C_1 \times e) - S_{E0}(\theta)) \tag{103}$$

A function f can be generally considered to be a monotone-increase function for the $S_E$, so that a change of the speed ratio e in the equation (103) allows an engine brake corresponding to the vehicle speed V to be exerted. Then, the speed ratio e is defined with the following equation:

$$e = e_0 - C_2(\alpha_{max} - \alpha) \tag{104}$$

where $e_0$ is a speed ratio in no-load condition that $T_E = 0$, and then, from the equation (103), the following equation is obtained:

$$V/(C_1 \times e) - S_{E0}(\theta) = 0$$

so that the $e_0$ is given by the following equation:

$$e_0 = V/(C_1 \times S_{E0}(\alpha)) \tag{105}$$

Also, $\alpha$ represents a displacement angle from the stepping-on reference point p to the actual accelerator stepping-on position $\theta$. That is, $\alpha$ is set such that, when $\alpha = 0$, the actual accelerator stepping-on position $\theta$ coincides with the stepping-on reference point p, and when $\alpha = \alpha_{max}$, the actual accelerator stepping-on position $\theta$ coincides with the accelerator open position. At that time, with $\alpha_{max}$ defined as follows:

$$\alpha_{max} = C_3 \times V \tag{106}$$

the stepping-on reference point p, where $\alpha = 0$, is shifted in position and set to the stepping-on side as the vehicle speed V increases.

According to the equations (104) through (106), the speed ratio e can be operated from the actual accelerator stepping-on position $\theta$ and the vehicle speed V. When the e has been calculated, at a step 125, the control signal x to allow the speed ratio e is inputted to the hydraulic pump 104, and thereafter the step is returned.

With such arrangement, at $\alpha_{max} < \theta <$ full, a control for normal traveling is performed, and at $0 \leq \theta \leq \alpha_{max}$, a control to develop the engine brake torque $T_E$ according to the equation (103) is performed. With the engine brake control, $\alpha_{max}$ is allowed to increase in proportion to the V according to the equation (106), so that the latitude in the selection of the $\theta$ is widened for a driver when he exerting moreover the engine brake as the speed increases, with the result that the engine brake torque $T_E$ can be freely used in various ways. On the other hand, the latitude in the selection of the $\theta$ is narrowed as the speed decreases, with the result that low-speed traveling or stopping operation can be smoothly performed without being accompanied by an unsuitable engine brake. The controller as shown in the drawings allows the driver to freely apply an engine brake matched with his driving sense to improve surely a traveling stability at a curve or a descent. Also, such control is performed through the accelerator operation, so that the shift to such deceleration condition can be simply made even from the acceleration region to provide an excellent operability. In particular, if $\theta = \alpha_{max}$ is made according to the equation (105), $T_E = 0$ (engine non-load condition) can be made just on the stepping-on reference point p, so that an acceleration or deceleration torque when the accelerator pedal 102 is stepped on forward and backward passing through the stepping-on reference point p is smoothly shifted, whereby the drive can be performed without feeling of physical disorder.

In either of the inventions, the coefficients in the above-described operational equations must be determined when practically used, and other correction coefficients can be added as appropriate. Also, operated results may have been previously made a map and the like. Further, without departing from the spirit of the present invention, various modifications can be made such that the hydraulic pump of a stepless-speed-changer employs fixed-displacement type and the hydraulic motor thereof employs variable-displacement type, or the both pump and motor employ variable-displacement type.

What is claimed is:

1. A stepless-speed-changer engine brake controller which is applied to a vehicle having a stepless-speed-changer arranged in a manner to steplessly change a speed ratio expressed as output revolution speed/input revolution speed, comprising:

detection means for detecting as an offset an angle displacement from the maximum opening to an actual opening in an accelerator opening variation region where the throttle opening is made zero; and control means for inputting the offset from the detection means and for controlling the speed ratio of said stepless-speed-changer in such a manner that an engine brake torque is not controlled under a normal driving condition in a region of negative offset and for controlling the speed ratio of the stepless-speed-changer in such a manner that an engine brake torque varies according to an increase or a decrease of the offset and the vehicle speed.

2. A stepless-speed-changer engine brake controller which is applied to a vehicle having a stepless-speed-changer arranged in a manner to steplessly change a speed ratio expressed as output revolution speed/input revolution speed, comprising:

detection means for detecting an actual accelerator stepping-on position;

detection means for detecting a vehicle speed; and control means for inputting the actual accelerator stepping-on position and the vehicle speed from the respective detection means, for providing a stepping-on reference point in such a manner that the position is moreover shifted to the stepping-on side as the vehicle speed increases, and for controlling the speed ratio of said stepless-speed-changer in such a manner that an engine brake torque is not controlled under a normal driving condition when the actual accelerator stepping-on position is deeper than the stepping-on reference point, and for controlling the speed ratio of the stepless-speed-changer in such a manner that an engine brake torque varies according to the magnitude of a displacement between the actual accelerator stepping-on position and the stepping-on reference point when the actual accelerator stepping-on position is shallower than the stepping-on reference point.

* * * * *